United States Patent
Tada et al.

(10) Patent No.: US 9,362,770 B2
(45) Date of Patent: Jun. 7, 2016

(54) DEVICE CONTROL APPARATUS AND DEVICE CONTROL METHOD

(71) Applicant: FUJITSU TEN LIMITED, Kobe-shi, Hyogo (JP)

(72) Inventors: Kenji Tada, Kobe (JP); Kenji Furukawa, Kobe (JP); Tohru Mikamo, Kobe (JP); Toshihito Sawai, Kobe (JP); Hideshi Nishizawa, Kobe (JP); Takashi Mizushima, Kobe (JP); Satoru Nakae, Kobe (JP); Kiyoshi Koyama, Kobe (JP); Ryoh Izumoto, Kobe (JP); Mitsuru Hanada, Kawasaki (JP)

(73) Assignee: FUJITSU TEN LIMITED, Kobe (JP)

( * ) Notice: Subject to any disclaimer, the term of this patent is extended or adjusted under 35 U.S.C. 154(b) by 150 days.

(21) Appl. No.: 14/164,913

(22) Filed: Jan. 27, 2014

(65) Prior Publication Data

US 2014/0210421 A1    Jul. 31, 2014

(30) Foreign Application Priority Data

Jan. 31, 2013    (JP) .................................. 2013-017916

(51) Int. Cl.
*H02J 7/00*    (2006.01)

(52) U.S. Cl.
CPC ....... *H02J 7/0063* (2013.01); *H02J 2007/0067* (2013.01)

(58) Field of Classification Search
USPC ................................................ 320/127–136
See application file for complete search history.

(56) References Cited

U.S. PATENT DOCUMENTS

| | | | |
|---|---|---|---|
| 6,601,176 B1 | 7/2003 | Alexander et al. | |
| 2006/0197498 A1* | 9/2006 | Bucur | H01M 2/1016 320/114 |
| 2012/0274284 A1* | 11/2012 | Firehammer | G01R 31/3658 320/118 |
| 2013/0099748 A1* | 4/2013 | Shimizu | H02J 7/0014 320/118 |

FOREIGN PATENT DOCUMENTS

| | | |
|---|---|---|
| DE | 102 50 616 C1 | 11/2003 |
| DE | 10 2004 026 383 A1 | 12/2005 |
| DE | 600 16 528 T2 | 6/2006 |
| DE | 10 2006 033 686 B3 | 4/2008 |
| DE | 10 2008 038 640 A1 | 2/2010 |
| JP | A-2003-345468 | 12/2003 |

OTHER PUBLICATIONS

Aug. 20, 2015 Office Action issued in Chinese Patent Application No. 201410034808.1.
Mar. 11, 2016 Office Action issued in German Patent Application No. 10 2014 201 590.1.

* cited by examiner

*Primary Examiner* — Binh Tat
(74) *Attorney, Agent, or Firm* — Oliff PLC

(57) ABSTRACT

A device control apparatus according to an embodiment includes a monitoring unit, a first processing unit, and a second processing unit. The monitoring unit monitors a state of voltage supply from a battery. When the start of the voltage supply is detected, the first processing unit starts the voltage supply to some devices, operates in a first operation mode, and executes a resume process of the devices. When the resume process is completed, the second processing unit starts the voltage supply to devices other than some devices, initializes states of the devices, and operates in a second operation mode in which consumption power is larger than consumption power of the first operation mode.

21 Claims, 7 Drawing Sheets

DEVICE CONTROL APPARATUS AND DEVICE CONTROL METHOD

CROSS-REFERENCE TO RELATED APPLICATIONS

This application is based upon and claims the benefit of priority of the prior Japanese Patent Application No. 2013-017916, filed on Jan. 31, 2013, the entire contents of which are incorporated herein by reference.

BACKGROUND OF THE INVENTION

1. Field of the Invention

The disclosed embodiment relates to a device control apparatus and a device control method.

2. Description of the Related Art

In the related art, in devices that execute information processing using a battery as a power supply, voltage supply from the battery may be stopped due to any cause. For this reason, in these devices, a resume function is provided.

The devices including the resume function execute a suspend process to store an operation state, when the voltage supply is stopped, and execute a resume process to return an operation state to the operation state stored by the suspend process and resumes work, when the voltage supply starts (for example, refer to JP 2003-345468 A).

However, in the case in which the battery is used as the power supply of the plurality of devices, when the resume process is executed, a necessary voltage may not be supplied to the devices and the devices may not normally resume the operation.

SUMMARY OF THE INVENTION

It is an object of the present invention to at least partially solve the problems in the conventional technology.

According to an aspect of an embodiment, a device control apparatus includes: a monitoring unit that monitors a state of voltage supply from a battery; a first processing unit that, when the start of the voltage supply is detected by the monitoring unit, starts the voltage supply from the battery to some devices among a plurality of devices using the battery as a power supply, operates in a first operation mode, and executes a resume process of the devices; and a second processing unit that, when the resume process is completed, starts the voltage supply from the battery to devices other than some devices, initializes states of the devices other than some devices, and operates in a second operation mode in which consumption power is larger than consumption power of the first operation mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The more perfect recognitions and associated advantages of the present invention will be easily understood by reading the following detailed description of the present invention with reference to the accompanying drawings in which.

DETAILED DESCRIPTION OF THE PREFERRED EMBODIMENTS

Hereinafter, an embodiment of a device control apparatus and a device control method disclosed by the present application will be described in detail with reference to the accompanying drawings. The present invention is not limited by the following embodiment.

An example of a device control apparatus that controls operations of a plurality of devices operating using a battery for a vehicle (hereinafter, simply referred to as a "battery") as a power supply will be described below. In the following description, to apply an output voltage of the battery or an accumulation unit to be described below to power supply terminals such as devices and supply power to the devices is called voltage supply. Therefore, the power supplied to the devices is described as a voltage below.

Specifically, the device control apparatus is a display/audio (DA) apparatus that is installed in a dashboard of the vehicle. The device control apparatus may be a smart phone in which application software (hereinafter, referred to as an "application") to control a plurality of devices using one battery as a power supply is stored. Hereinafter, the case in which an output voltage of the battery at the time of full charging is 12 V and a power supply voltage necessary for an operation of each device is 5 V will be described.

In the recent vehicle, a function for automatically stopping an engine when the vehicle temporarily stops and automatically starting the engine when traveling is resumed is provided in consideration of an environmental aspect and the stop and the start of the engine are repeated frequently.

When the engine starts, relatively large power (voltage) is necessary. For this reason, the output voltage of the battery may be temporarily less than 5 V. In this case, because the voltage is insufficient, the operation of the device is forcibly ended. Then, even when the output voltage of the battery is recovered, the operation of the device cannot be normally resumed.

In order to suppress the outbreak of such a situation, the device control apparatus according to the embodiment executes a suspend process to store an operation state of the device, when the voltage supply from the battery is stopped. Then, when the voltage supply from the battery is resumed, the device control apparatus executes a resume process to return an operation state of the device to the operation state stored by the suspend process and normally resumes the operation of the device. However, when the number of devices using the battery as the power supply is large, a time and consumption power necessary for the resume process increase.

Therefore, when the voltage supply from the battery supplying the voltage to the plurality of devices is resumed, the device control apparatus according to the embodiment performs control to normally perform the resume of the operations of the devices.

Figure 1:
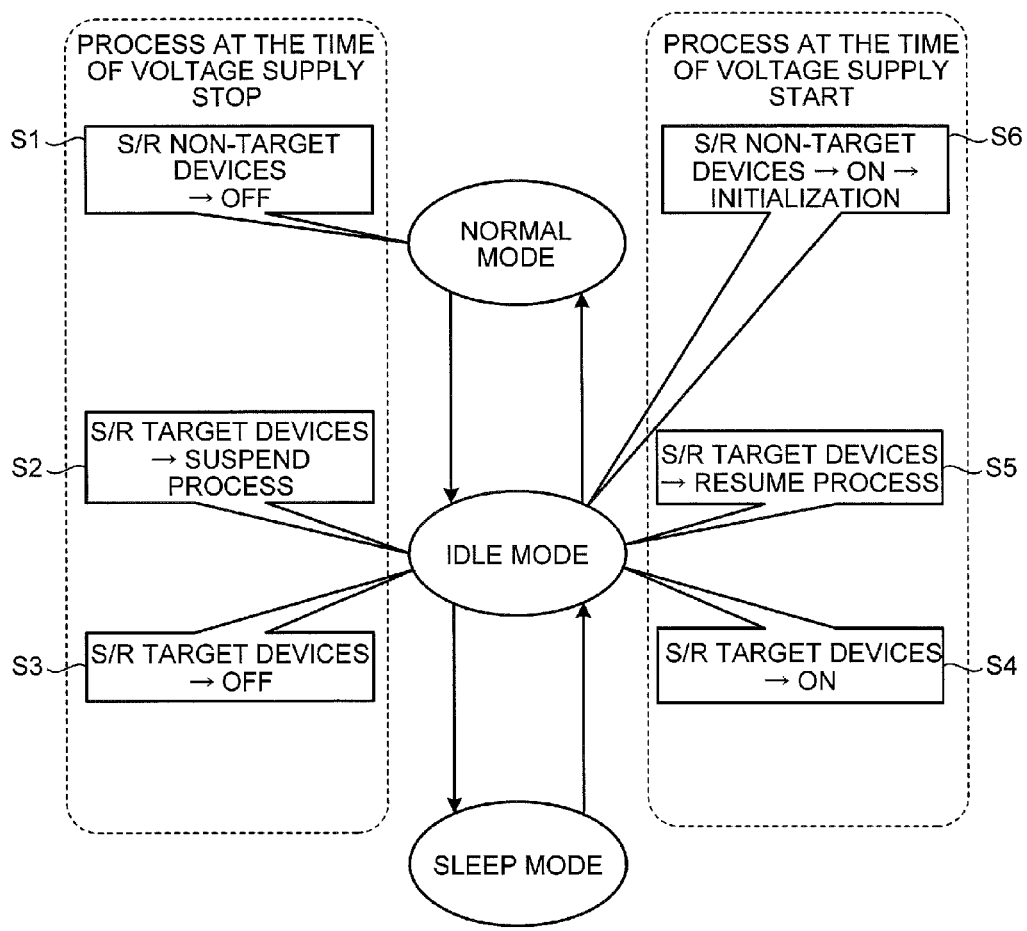
FIG. 1 is a diagram illustrating an operation of a device control apparatus according to an embodiment.

FIG. 1 is a diagram illustrating an operation of the device control apparatus according to the embodiment. As illustrated in FIG. 1, the device control apparatus operates in three kinds of operation modes in which consumption power is different and controls the operations of the plurality of devices.

Specifically, the device control apparatus can operate in the three kinds of operation modes including a sleep mode in which the consumption power is minimum, an idle mode to be a first operation mode in which the consumption power is larger than the consumption power of the sleep mode, and a normal mode to be a second operation mode in which the consumption power is larger than the consumption power of the idle mode.

Here, the normal mode is, for example, an operation mode in which the output voltage of the battery is higher than 5 V. In addition, the idle mode is an operation mode in which the output voltage of the battery is equal to or lower than 5 V. In addition, the sleep mode is an operation mode in which the device control apparatus is in a waiting state.

When the voltage supply from the battery is stopped, the device control apparatus executes a process at the time of a voltage supply stop and when the voltage supply is resumed, the device control apparatus executes a process at the time of a'voltage supply start. Specifically, when an output voltage value of the battery decreases to a predetermined value during a period in which the device control apparatus controls the operations of the devices in the normal mode, the device control apparatus determines that the voltage supply from the battery is stopped and starts the process at the time of the voltage supply stop. Then, when a predetermined condition is realized after the output voltage value of the battery is recovered to the value before decreasing, the device control apparatus determines that the voltage supply is resumed and starts the process at the time of the voltage supply start.

In the process at the time of the voltage supply stop, the device control apparatus performs different control for each of some devices and the other devices among the plurality of devices using the battery as the power supply. Here, some devices are devices (hereinafter, referred to as "S/R target devices") set previously as targets of the suspend process and the resume process among the plurality of devices. In addition, the devices other than some devices are devices (hereinafter, referred to as "S/R non-target devices") set previously as non-targets of the suspend process and the resume process among the plurality of devices.

If the device control apparatus starts the process at the time of the voltage supply stop, first, the device control apparatus stops (OFF) the voltage supply from the battery to the S/R non-target devices (step S1). Thereby, entire consumption power of a device group using the battery as the power supply can be decreased. Next, the device control apparatus changes the operation mode from the normal mode to the idle mode in which the consumption power is smaller than the consumption power of the normal mode. Thereby, the consumption power can be further decreased.

Then, the device control apparatus executes the suspend process of the S/R target devices (step S2). After the suspend process is completed, the device control apparatus stops (OFF) the voltage supply to the S/R target devices (step S3). Then, the device control apparatus changes the operation mode from the idle mode to the sleep mode in which the consumption power is smaller than the consumption power of the idle mode and becomes the waiting state.

As such, when the voltage supply from the battery is stopped, the device control apparatus performs the stop of the voltage supply to the S/R non-target devices and the change from the normal mode to the idle mode and decreases the consumption power.

Thereby, the device control apparatus can use power to be consumed when the device control apparatus does not perform the stop of the voltage supply to the S/R non-target devices and the change from the normal mode to the idle mode, for the suspend process of the S/R target devices. Therefore, according to the device control apparatus, the suspend process of the S/R target devices can be normally completed.

Meanwhile, in the process at the time of the voltage supply start, first, the device control apparatus changes the operation mode from the sleep mode to the idle mode and starts (ON) the voltage supply to the S/R target devices (step S4) and executes the resume process of the S/R target devices (step S5). After the resume process is completed, the device control apparatus starts (ON) the voltage supply to the S/R non-target devices (step S6) and changes the operation mode from the idle mode to the normal mode.

As such, when the voltage supply from the battery is resumed, the device control apparatus executes the resume process of the S/R target devices while operating in the idle mode in which the consumption power is relatively small, before starting the voltage supply to the S/R non-target devices.

Thereby, the device control apparatus can execute the resume process of the S/R target devices with the consumption power smaller than the consumption power in the case in which the device control apparatus operates in the normal mode and executes the resume process of all the devices.

Therefore, even when the output voltage of the battery starts to decrease again during the resume process, the device control apparatus can normally complete the resume process for the S/R target devices and shorten a start time. The device control apparatus does not execute the resume process for the S/R non-target devices. However, because the device control apparatus executes an initialization process for the S/R non-target devices, the device control apparatus can normally start the S/R non-target devices.

Figure 2:
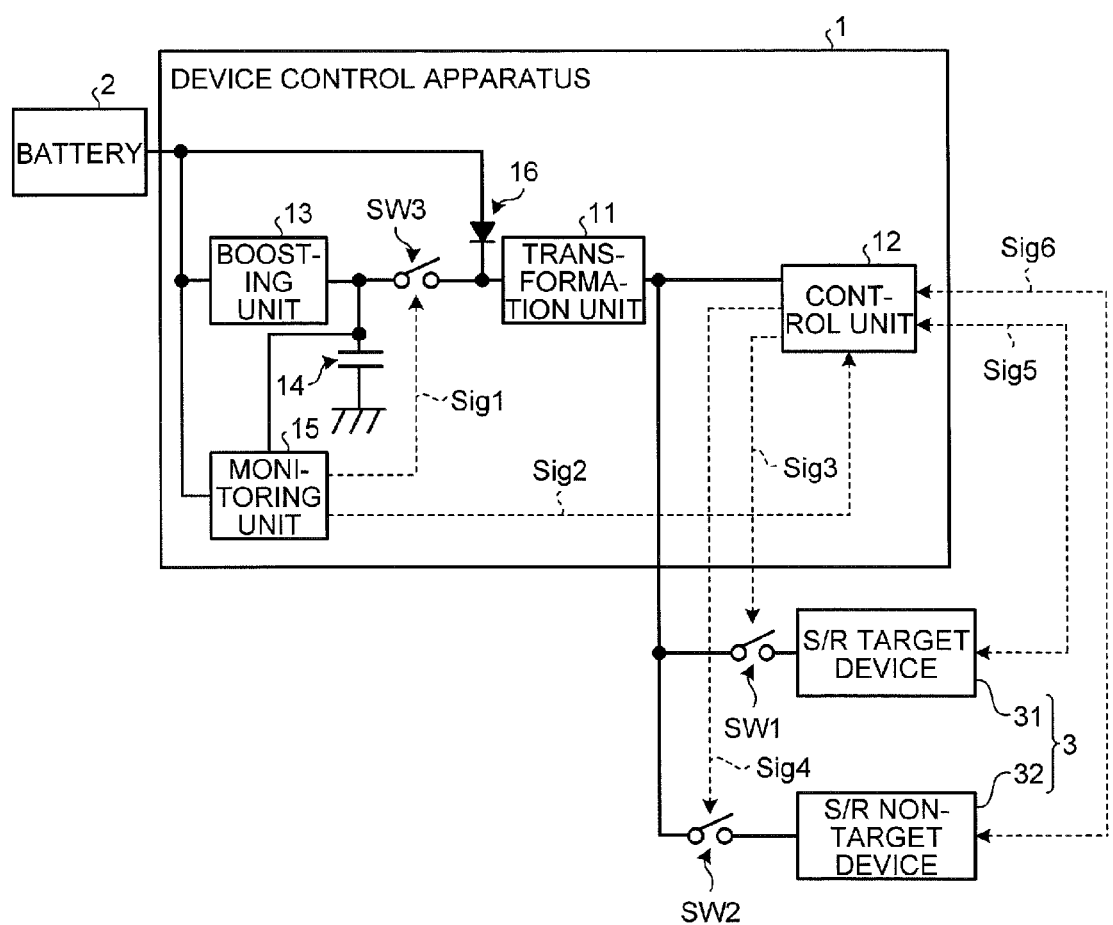
FIG. 2 is a diagram illustrating an example of a configuration of the device control apparatus according to the embodiment.

Next, an example of a configuration of the device control apparatus will be described with reference to FIG. 2. FIG. 2 is a diagram illustrating an example of a configuration of a device control apparatus 1 according to the embodiment. As illustrated in FIG. 2, the device control apparatus 1 is connected between a battery 2 and a plurality of devices 3 provided in a vehicle, operates by a voltage supplied from the battery 2, and supplies the voltage output from the battery 2 to the devices 3. In addition, the device control apparatus 1 controls an operation of each device 3.

Here, the battery 2 is a battery of 12 V that is mounted to the vehicle. The battery 2 supplies the voltage to all electronic apparatuses provided in the vehicle, such as a starter motor to start an engine of the vehicle or a light, in addition to the device control apparatus 1 and the devices 3.

The devices 3 include S/R target devices 31 and S/R non-target devices 32. The S/R target devices 31 are a device group in which throughput and consumption power necessary for the start or the end are smaller than throughput and consumption power of the S/R non-target device 32. The S/R target devices 31 are, for example, an embedded multi media card (EMMC) (registered trademark), a flash memory, a gyro sensor, and a touch panel device provided in a display.

Meanwhile, the S/R non-target devices 32 are a device group in which the throughput and the consumption power necessary for the start or the end are larger than the throughput and the consumption power of the S/R target device 31. The S/R non-target devices 32 are, for example, a player and a recorder of audio or video and various displays. The S/R non-target devices 32 are connected to the device control apparatus 1 by wireless fidelity (WiFi) (registered trademark) or high definition multimedia interface (HDMI) (registered trademark).

In this embodiment, the plurality of devices 3 are classified into the S/R target devices 31 and the S/R non-target devices 32, on the basis of the magnitudes of the throughput and the consumption power necessary for the start or the end. However, this classification can be changed arbitrarily by setting.

For example, the devices 3 that are used frequently by a user may be classified as the S/R target devices 31 and the other devices 3 may be classified as the S/R non-target devices 32. In addition, the classification of the S/R target devices 31 and the S/R non-target devices 32 may be changed automatically and regularly according to the use frequency of the user.

As such, the S/R target devices 31 and the S/R non-target devices 32 are classified, so that a subjective (superficial) start time until the devices 3 start from a state of the sleep mode can be shortened.

The device control apparatus 1 includes a transformation unit 11, a control unit 12, a boosting unit 13, an accumulation unit 14, and a monitoring unit 15. The transformation unit 11 transforms a voltage input from the battery 2 or the accumulation unit 14 to 5 V and outputs the voltage to the control unit 12 and the devices 3. A first switch SW1 is provided between the transformation unit 11 and the S/R target devices 31 and a second switch SW2 is provided between the transformation unit 11 and the S/R non-target devices 32.

In addition, in the device control apparatus 1, a series connection object of the boosting unit 13 and the third switch SW3 is provided between the battery 2 and the transformation unit 11. This series connection object is connected in parallel to a connection line connecting the battery 2 and the transformation unit 11. In addition, the accumulation unit 14 is connected between a connection point of the boosting unit 13 and the third switch SW3 and a ground.

The boosting unit 13 boosts the voltage input from the battery 2 to 24 V and outputs the voltage. The accumulation unit 14 is a capacitor that is charged by the voltage boosted by the boosting unit. A voltage of 24 V is accumulated between a pair of electrodes of the capacitor in a state of full charging. The accumulation unit 14 is not limited to the capacitor and may be a battery such as a lithium ion battery.

The monitoring unit 15 is a processing unit that detects an output voltage of the battery 2 and monitors a state of the voltage supply from the battery 2. For example, when the output voltage of the battery 2 decreases to 5 V, the monitoring unit 15 outputs a switching signal Sig1 to turn on the third switch SW3.

Thereby, when the voltage output from the battery 2 to the transformation unit 11 is almost less than 5 V, the monitoring unit 15 supplies the voltage from the accumulation unit 14 to the transformation unit 11, so that the voltage supplied to the transformation unit 11 can be boosted to 24 V.

Therefore, in the device control apparatus 1, even in a state in which the output voltage of the battery 2 becomes temporarily less than a voltage necessary for the operation of the control unit 12 or the device 3, the operation of the control unit 12 or the device 3 can be continuously executed by the voltage accumulated by the accumulation unit 14, during a predetermined period. A related point will be described below with reference to FIG. 6.

In addition, the device control apparatus 1 includes a diode 16 in which a cathode is connected to the connection point of the third switch SW3 and the transformation unit 11 and an anode is connected to the battery 2. Thereby, in the device control apparatus 1, the third switch SW3 is turned on and when the voltage of 24 V is supplied from the accumulation unit 14 to the transformation unit 11, a current of which a voltage is 24 V can be prevented from reversely flowing to the battery 2 and the battery 2 can be prevented from being damaged.

The boosting unit 13 is not an essential element and may be omitted. When the boosting unit 13 is omitted, an operation continuation time of the control unit 12 or the device 3 is slightly shortened. However, a circuit configuration can be simplified and a cost can be reduced.

The monitoring unit 15 determines the stop and the start of the voltage supply from the battery 2, on the basis of the output voltage of the battery 2. In addition, the monitoring unit 15 monitors the voltage of the accumulation unit 14 and determines a charging rate of the accumulation unit 14. In addition, the monitoring unit 15 outputs a state signal Sig2 showing the state of the voltage supply and the accumulation rate of the accumulation unit 14 showing determination results to the control unit 12.

When the state signal Sig2 showing that the voltage supply from the battery 2 is stopped is input, the control unit 12 starts the process at the time of the voltage supply stop. In addition, when the state signal Sig2 showing that the voltage supply from the battery 2 starts is input, the control unit 12 starts the process at the time of the voltage supply start.

In addition, the control unit 12 outputs the switching signal Sig3 to the first switch SW1 to perform ON/OFF control of the first switch SW1 and outputs a switching signal Sig4 to the second switch SW2 to perform ON/OFF control of the second switch SW2.

Figure 3:
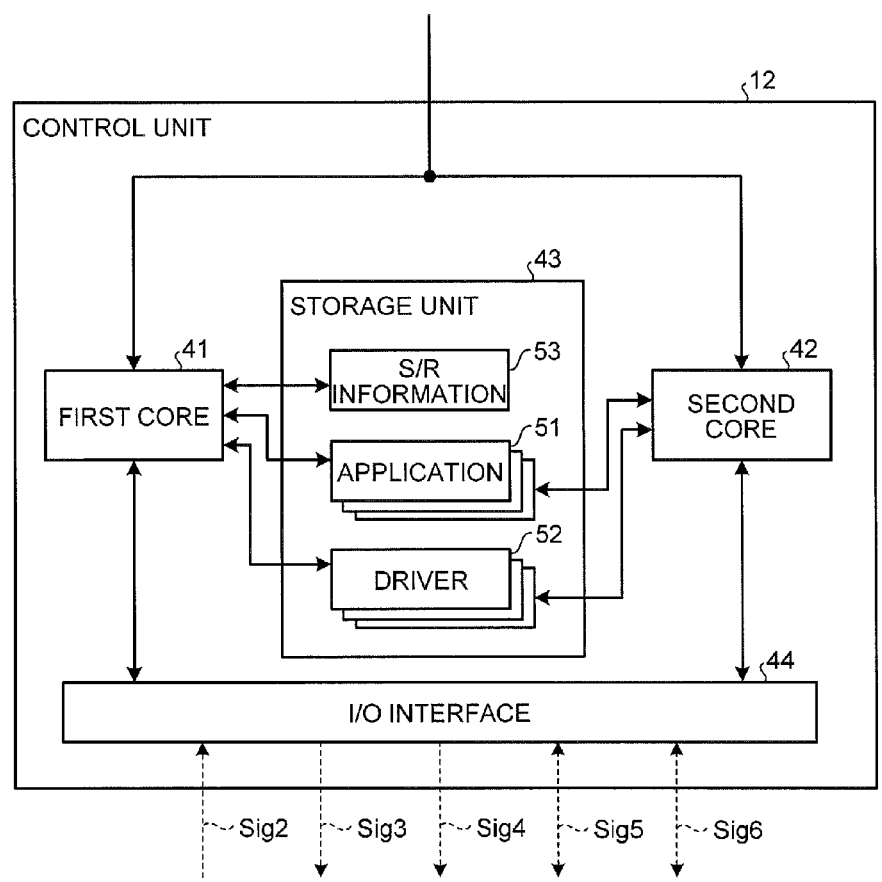
FIG. 3 is a diagram illustrating an example of a configuration of a control unit according to the embodiment.

Furthermore, the control unit 12 transmits and receives a control signal Sig5 between the S/R target devices 31 and the control unit 12 and controls the operations of the S/R target devices 31. In addition, the control unit 12 transmits and receives a control signal Sig6 between the S/R non-target devices 32 and the control unit 12 and controls the operations of the S/R non-target devices 32. Next, an example of a configuration of the control unit 12 will be described with reference to FIG. 3. FIG. 3 is a diagram illustrating an example of the configuration of the control unit 12 according to the embodiment.

As illustrated in FIG. 3, the control unit 12 is a dual core processor that includes a first core 41, a second core 42, a storage unit 43, and an I/O interface 44. The storage unit 43 stores a plurality of applications 51, a plurality of drivers 52, and S/R information 53.

Here, the application 51 is software that has an interface with the user. The application 51 is executed by the first core 41 or the second core 42 and provides a function of each device 3 to the user.

In addition, the driver 52 is software that has an interface between the application 51 and the device 3. The driver 52 is executed by the first core 41 or the second core 42 and drives each corresponding device 3.

In addition, the S/R information 53 is information showing a state of the S/R target device 31 which the first core 41 writes by the suspend process, when the voltage supply is stopped. In addition, the S/R information 53 is information showing a state of the S/R target device 31 which the first core 41 reads by the resume process, when the voltage supply starts.

The I/O interface 44 is a communication interface that transmits and receives the state signal Sig2, the switching signals Sig3 and Sig4, and the control signals Sig5 and Sig6 between the first core 41 and the second core 42 and the monitoring unit 15, the first switch SW1, the second switch SW2, and the devices 3.

The first core 41 is a core processor that functions as a first processing unit and has a processing speed lower than a processing speed of the second core 42, but operates with consumption power smaller than consumption power of the second core 42. When the voltage supply from the battery 2 starts, the first core 41 outputs a switching signal Sig3 to start the voltage supply from the battery 2 to the S/R target devices 31, operates in the idle mode, and executes the resume process of the S/R target devices 31.

In addition, the first core 41 determines whether the applications 51 using the S/R non-target devices 32 start or not before the voltage supply from the battery 2 to the S/R non-target devices 32 is stopped, on the basis of the S/R information 53, during the resume process. When the applications 51 using the S/R non-target devices 32 start before the voltage supply is stopped, the first core 41 ends the applications 51 during a period in which the resume process is executed.

Meanwhile, the second core 42 is a core processor that functions as a second processing unit and has the consumption power larger than the consumption power of the first core 41, but has the processing speed higher than the processing speed of the first core 41. When the resume process of the S/R target devices 31 is completed, the second core 42 outputs a switching signal Sig4 to start the voltage supply from the battery 2 to the S/R non-target devices 32, initializes the states of the S/R non-target devices 32, and operates in the normal mode.

As such, in the device control apparatus 1, the S/R non-target devices 32 are initialized after the resume process and the applications using the S/R non-target devices 32 started before the voltage supply is stopped are ended during the resume process executed before the initialization. Therefore, according to the device control apparatus 1, when the applications 51 using the S/R non-target devices 32 are started thereafter, the S/R non-target devices 32 can be normally operated from an initial state.

In addition, when the voltage supply from the battery 2 is stopped, the second core 42 executes a process for prohibiting the control signal Sig6 becoming an operation request for the S/R non-target devices 32 from being input to the S/R non-target devices 32. Then, the second core 42 stops the voltage supply from the battery 2 to the S/R non-target devices 32.

Thereby, the S/R non-target devices 32 can be prevented from being damaged due to the input of the control signal Sig6 from the second core 42 to the S/R non-target devices 32, in a state in which the voltage is not supplied from the battery 2 to the S/R non-target devices 32.

When the voltage supply from the battery 2 to the S/R non-target devices 32 is stopped, the first core 41 operates in the idle mode and executes the suspend process of the S/R target devices 31. Then, the first core 41 outputs the switching signal Sig3 to stop the voltage supply from the battery 2 to the S/R target devices 31.

Figure 4:
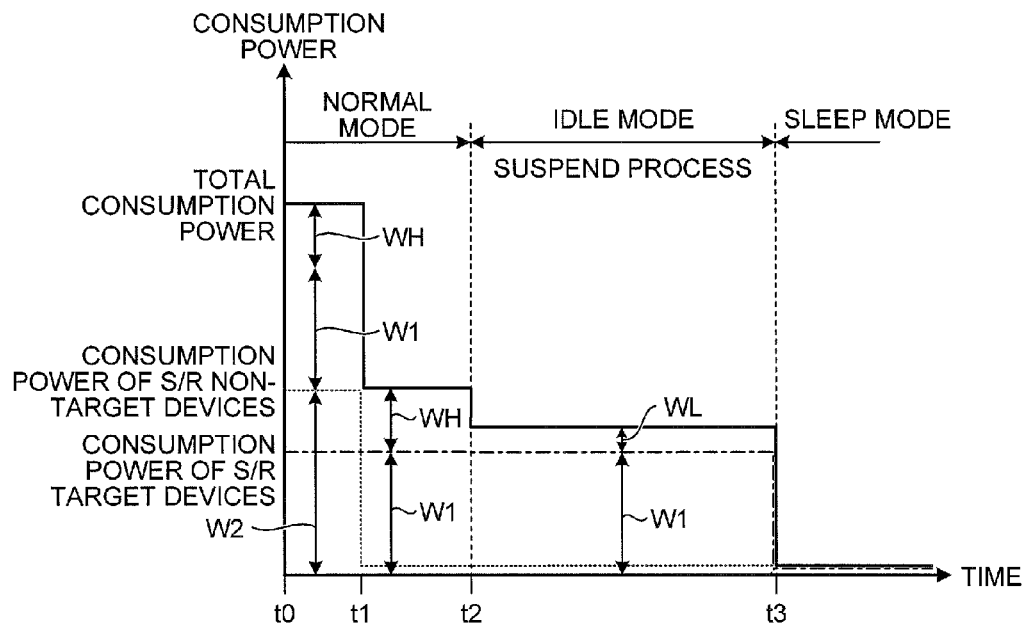
FIG. 4 is a diagram illustrating a change of consumption power during a process at the time of a voltage supply stop in the embodiment.

Next, a change of consumption power during a period in which the process at the time of the voltage supply stop is executed will be described with reference to FIG. 4. FIG. 4 is a diagram illustrating the change of the consumption power during the process at the time of the voltage supply stop in the embodiment. Hereinafter, a sum of consumption power of the control unit 12 and consumption power of all of the devices 3 is described as total consumption power.

As illustrated in FIG. 4, when the device control apparatus 1 operates in the normal mode (times t0 to t2), the total consumption power becomes a sum of consumption power W2 of the S/R non-target devices 32, consumption power W1 of the S/R target devices 31, and consumption power WH of the control unit 12 in the normal mode.

For example, when the voltage supply from the battery 2 is stopped at the time 0, the second core 42 performs protection setting of the S/R non-target devices 32, such as prohibiting an input of an operation command to the S/R non-target devices 32. A specific example of the protection setting of the S/R non-target devices 32 will be described below with reference to a flowchart illustrated in FIG. 8.

Then, the second core 42 stops the voltage supply to the S/R non-target devices 32 at the time t1. Thereby, the S/R non-target devices 32 become a waiting state and consumption power becomes almost zero. For this reason, the total consumption power becomes a sum of consumption power W1 of the S/R target devices 31 and the consumption power WH of the control unit 12 in the normal mode and the total consumption power decreases.

Next, instead of the second core 42, the first core 41 starts the operation in the idle mode at the time t2. Thereby, the total consumption power becomes a sum of the consumption power W1 of the S/R target devices 31 and the consumption power WL of the control unit 12 in the idle mode and the total consumption power further decreases. In addition, the first core 41 executes the suspend process of the S/R target devices 31 during the operation in the idle mode. Then, when the suspend process ends at a time t3, the first core 41 stops the voltage supply to the S/R target devices 31 and changes to the sleep mode.

Figure 5:
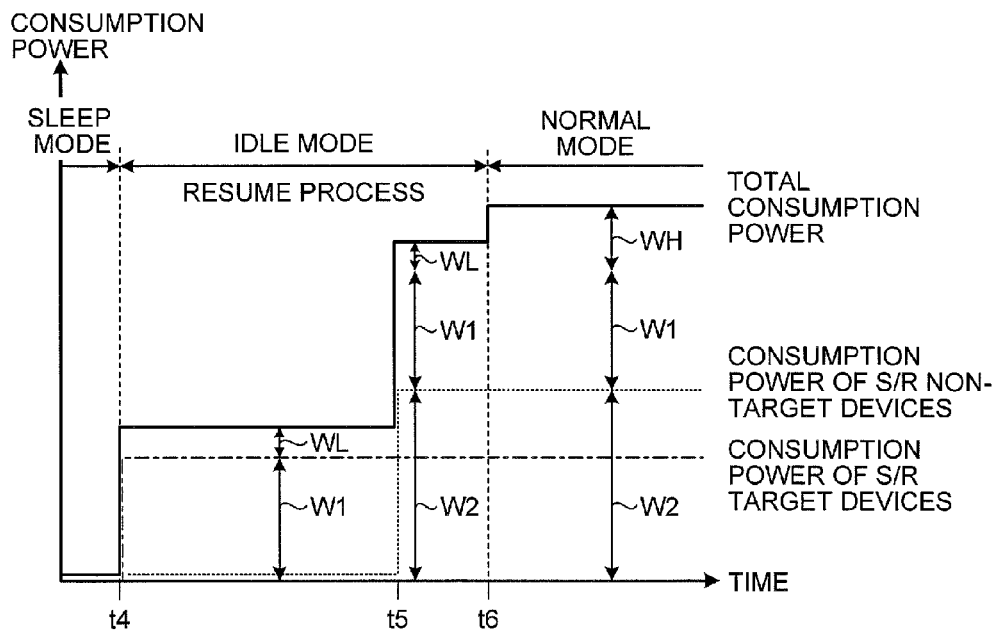
FIG. 5 is a diagram illustrating a change of consumption power during a process at the time of a voltage supply start in the embodiment.

Next, a change of consumption power during a period in which the process at the time of the voltage supply start is executed will be described with reference to FIG. 5. FIG. 5 is a diagram illustrating the change of the consumption power during the process at the time of the voltage supply start in the embodiment. As illustrated in FIG. 5, when the voltage supply from the battery 2 starts at a time t4 during a period in which the device control apparatus 1 operates in the sleep mode, the first core 41 changes from the sleep mode to the idle mode and starts the voltage supply to the S/R target devices 31.

Next, the first core 41 executes the resume process of the S/R target devices 31 during a period (t4 to t5) of the idle mode. The total consumption power during the period of the times t4 to t5 becomes a sum of the consumption power W1 of the S/R target devices 31 and the consumption power WL of the control unit 12 in the idle mode.

Then, the first core 41 starts the power supply to the S/R non-target devices 32 at a time t5 during the period of the idle mode and initializes the states of the S/R non-target devices 32 during a period of times t5 to t6 to be the period of the idle mode. For this reason, the total consumption power during the period of the times t5 to t6 becomes a sum of the consumption power W1 of the S/R target devices 31, the consumption power W2 of the S/R non-target devices 32, and the consumption power WL of the control unit 12 in the idle mode.

In addition, if the initialization of the S/R non-target devices 32 is completed at the time t6, instead of the first core 41, the second core 42 changes to the normal mode. Then, the second core 42 performs the operation control of the devices 3 in the normal mode. For this reason, the total consumption power in the normal mode after the time t6 becomes a sum of the consumption power W1 of the S/R target devices 31, the consumption power W2 of the S/R non-target devices 32, and the consumption power WH of the control unit 12 in the normal mode. The first core 41 can execute a process for supporting the control executed by the second core 42, in processes after the time t6.

As such, according to the device control apparatus 1, the resume process of the S/R target devices 31 and the initialization of the S/R non-target devices 32 are executed with the total consumption power smaller than the total consumption power consumed in the normal mode, during the process at the time of the voltage supply start. Thereby, even though the output voltage of the battery 2 decreases during the process at the time of the voltage supply start, the S/R target devices 31 and the S/R non-target devices 32 can be normally started.

Figure 6:
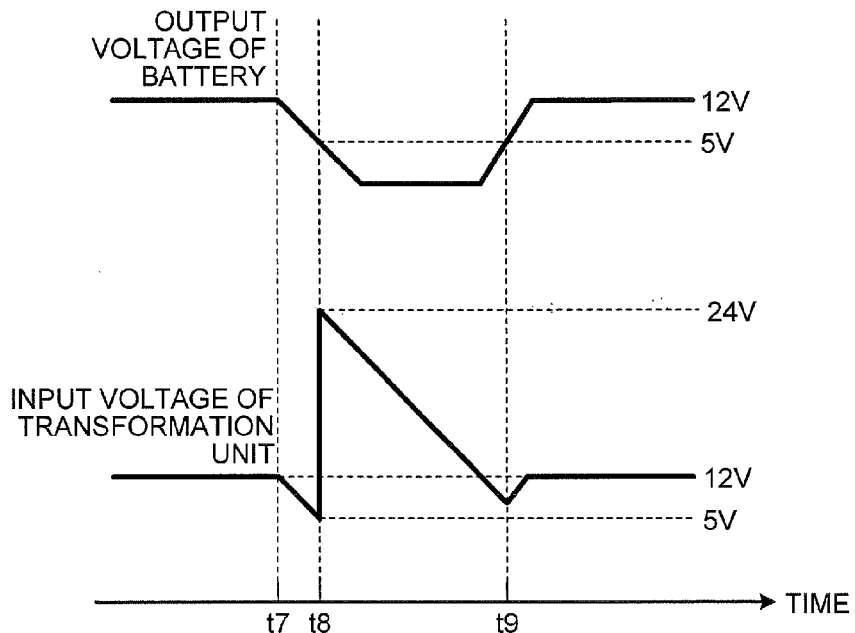
FIG. 6 is a diagram illustrating a correspondence relation of a change of an output voltage of a battery and a change of an input voltage of a transformation unit according to the embodiment.

Next, an example of ON/OFF control of the third switch SW3 by the monitoring unit 15 will be described with reference to FIG. 6. FIG. 6 is a diagram illustrating a correspondence relation of a change of an output voltage of the battery 2 and a change of an input voltage of the transformation unit 11 according to the embodiment.

As illustrated in FIG. 6, for example, if the output voltage of the battery 2 decreases due to any cause at a time t7 during the operations of the devices 3 using the battery 2 as the power supply in a state in which the third switch SW3 is turned off, the input voltage of the transformation unit 11 also decreases. In addition, the output voltage of the battery 2 decreases to 5 V necessary for the operations of the devices 3 at a time t8. Then, when the output voltage further decreases, the devices 3 may not perform a normal operation.

Therefore, when the output voltage of the battery 2 decreases to 5 V at a time t8, the monitoring unit 15 turns on the third switch SW3 and causes the voltage to be supplied from the accumulation unit 14 to the transformation unit 11. The accumulation unit 14 is charged by the output voltage of the battery 2 boosted to 24 V by the boosting unit 13 before the output voltage of the battery 2 decreases. Therefore, if the third switch SW3 is turned on at the time t8, the accumulation unit 14 supplies the voltage of 24 V to the transformation unit 11.

Thereby, the devices 3 not executing the normal operation after the time t8 when the accumulation unit 14 is not provided can be normally operated after the time t8. Then, when the output voltage of the battery 2 is recovered and increases to 5 V at a time t9, the monitoring unit 15 turns off the third switch SW3.

The input voltage of the transformation unit 11 supplied by the accumulation unit 14 gradually decreases during the period of the times t8 to t9. However, if the input voltage is equal to or higher than 5 V at a point of time of the time t9, the normal operations of the devices 3 can be secured.

Figure 7:
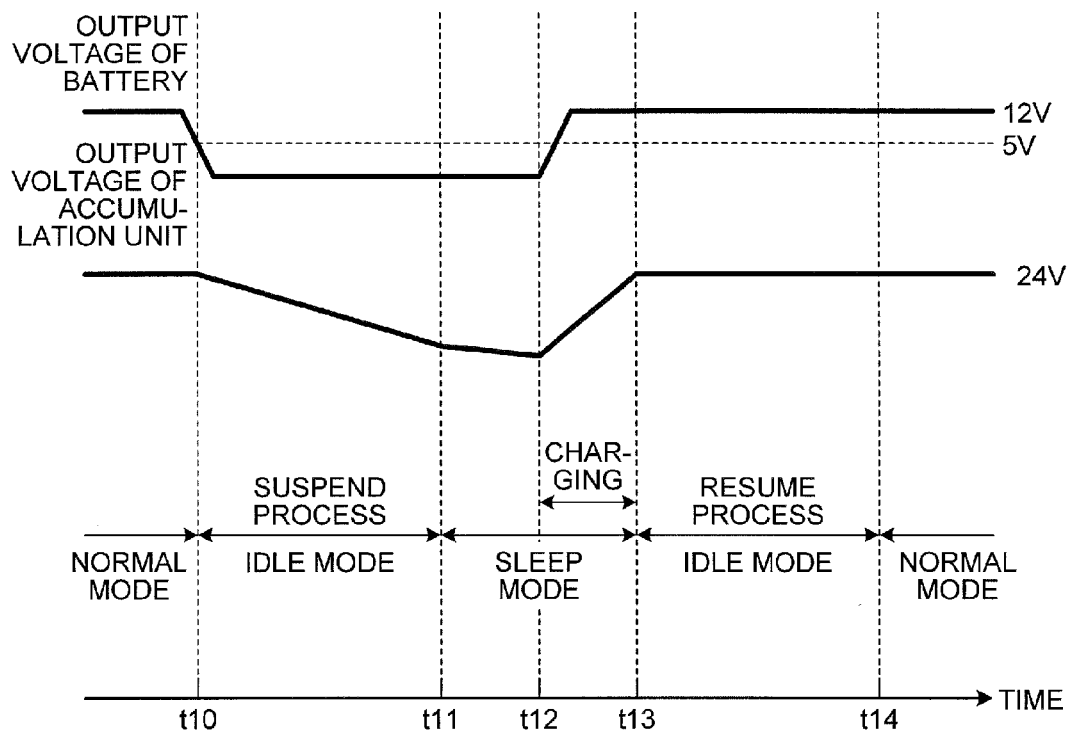
FIG. 7 is a diagram illustrating a correspondence relation of an output voltage of the battery, an output voltage of an accumulation unit, and an operation state of the device control apparatus according to the embodiment.

Next, timing when the device control apparatus 1 starts the resume process will be described with reference to FIG. 7. FIG. 7 is a diagram illustrating a correspondence relation of an output voltage of the battery 2, an output voltage of the accumulation unit 14, and an operation state of the device control apparatus 1 according to the embodiment.

As illustrated in FIG. 7, the device control apparatus 1 operates in the normal mode, until the output voltage of the battery 2 decreases to 5 V at a time t10. In addition, if the output voltage of the battery 2 decreases to 5 V at the time t10, as described above, the device control apparatus 1 operates in the idle mode and executes the suspend process of the S/R target devices 31. After the time t10, the accumulation unit 14 is used as the power supply as described above. For this reason, the output voltage of the accumulation unit 14 gradually decreases.

In addition, when the suspend process is completed at a time t11, the device control apparatus 1 changes to the sleep mode. Then, if the output voltage of the battery 2 starts to increase at a time t12 during the sleep mode, charging of the accumulation unit 14 starts and the output voltage gradually increases.

Here, when the output voltage of the battery 2 increases to 5 V, the device control apparatus 1 switches the power supply from the accumulation unit 14 to the battery 2. However, the device control apparatus 1 does not start the resume process of the S/R target devices 31 at this point of time and continuously maintains the sleep mode to a time t13 when a charging rate of the accumulation unit 14 reaches a predetermined value. FIG. 7 illustrates the case in which a predetermined value regarding a charging rate is a charging rate (100%) at the time of full charging. However, the predetermined value may be any charging rate such as 90% or 95%.

When the charging rate reaches the predetermined value at the time t13, the device control apparatus 1 changes to the idle mode and starts the resume process of the S/R target devices 31. Then, the device control apparatus 1 executes the initialization of the S/R non-target devices 32 and then operates in the normal mode after a time t14.

As such, the device control apparatus 1 starts the resume process at a point of time (time t13) when the charging rate of the accumulation unit 14 reaches the predetermined value, not a point of time when the output voltage of the battery 2 increases to 5 V. Thereby, even when the output voltage of the battery 2 decreases to less than 5 V again due to any cause immediately after the output voltage of the battery 2 is recovered to 5 V, the device control apparatus 1 can normally complete the resume process and normally start the devices 3, by the voltage supplied from the accumulation unit 14.

Figure 8:
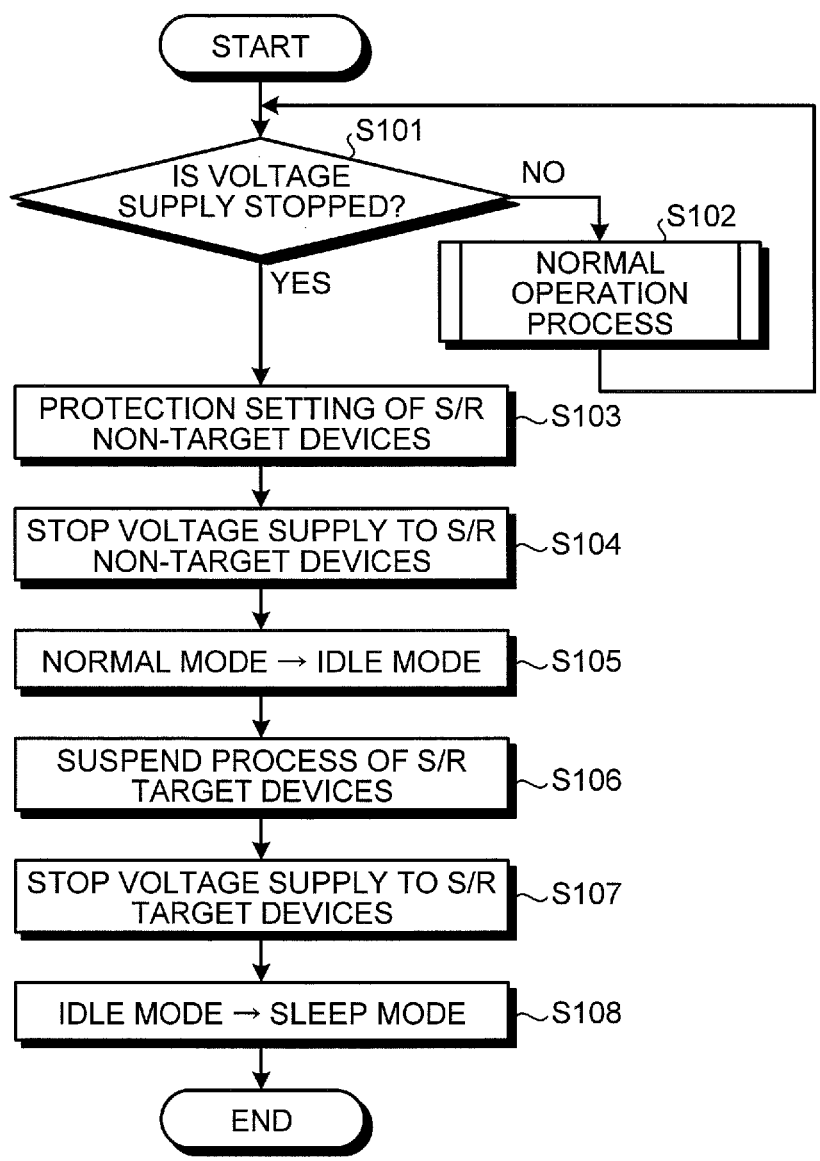
FIG. 8 is a flowchart illustrating a process at the time of a voltage supply stop according to the embodiment.

Next, the process at the time of the voltage supply stop executed by the device control apparatus 1 will be described with reference to FIG. 8. FIG. 8 is a flowchart illustrating the process at the time of the voltage supply stop according to the embodiment. As illustrated in FIG. 8, in the device control apparatus 1, the monitoring unit 15 determines whether the voltage supply from the battery 2 is stopped, during the operation in the normal mode (step S101).

Here, when the output voltage of the battery 2 is higher than 5 V, the monitoring unit 15 determines that the voltage supply from the battery 2 is not stopped (step S101, No) and outputs the state signal Sig2 showing that the voltage supply from the battery 2 is not stopped to the control unit 12. If this state signal Sig2 is input, the control unit 12 executes the normal operation process (step S102) and makes the process proceed to step S101. In the normal operation process, the control unit 12 operates in the normal mode and controls the operations of the devices 3.

Meanwhile, when the output voltage of the battery 2 decreases to 5 V, the monitoring unit 15 determines that the voltage supply is stopped (step S101, Yes) and outputs the state signal Sig2 showing that the voltage supply is stopped to the control unit 12. Furthermore, the monitoring unit 15 outputs the switching signal Sig1 to turn on the third switch SW3 and makes the process proceed to step S103. A determination reference used when the monitoring unit 15 determines whether the voltage supply is stopped is not limited to 5 V and may be any voltage.

In step S103, the control unit 12 performs the protection setting of the S/R non-target devices 32. Here, the control unit 12 performs setting for making a terminal connected to the S/R non-target devices 32 in output terminals of the I/O interface 44 become a high impedance state. Thereby, the S/R non-target devices 32 can be prevented from being damaged due to the input of the control signal Sig6 to the S/R non-target devices 32, in a state in which the voltage supply is stopped.

In addition, when a process for having access to the S/R non-target devices 32 exists in the applications 51 using the S/R non-target devices 32, the control unit 12 stores the process (application 51) in the S/R information 53 without executing the process and sets the state as the waiting state. Furthermore, the control unit 12 performs setting to make an operation command input thereafter handled as an error, for each driver 52.

By this protection setting, the S/R non-target devices 32 can be prevented from being damaged due to the input of the control signal Sig6 to the S/R non-target devices 32 or the S/R non-target devices 32 can be prevented from being erroneously operated due to the insufficient supply voltage, in a state in which the voltage supply is stopped.

The protection setting other than the setting for making the terminal connected to the S/R non-target devices 32 in the output terminals of the I/O interface 44 become the high impedance state, among the protection setting, may be executed during the suspend process to be described below.

Then, the control unit 12 outputs the switching signal Sig4 to turn off the second switch SW2 and stops the voltage supply to the S/R non-target devices 32 (step S104). Next, the control unit 12 performs a temporary stop request to request all of the applications 51 during the start to temporarily stop all of the processes during the execution and stores the states of the applications 51 during the start as the S/R information 53 in the storage unit 43. Then, the control unit 12 changes from the normal mode to the idle mode (step S105).

Here, the control unit 12 changes from the normal mode to the idle mode without waiting for a response to the temporary stop request from each application 51. In addition, the control unit 12 executes the suspend process of the S/R target devices 31 (step S106). Then, the control unit 12 outputs the switching signal Sig3 to turn off the first switch SW1 and stops the voltage supply to the S/R target devices 31 (step S107). The control unit 12 changes from the idle mode to the sleep mode (step S108) and ends the process.

Figure 9:
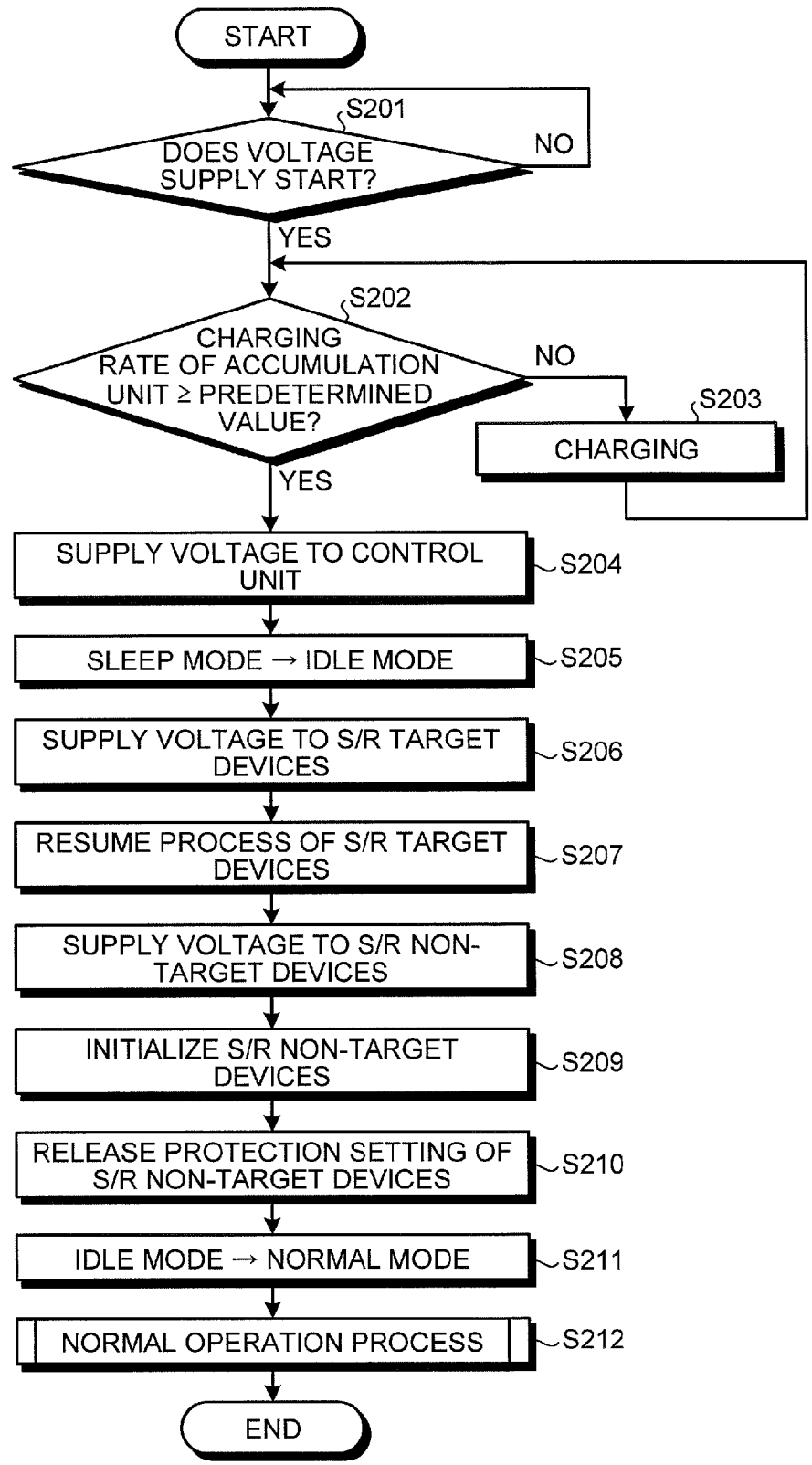
FIG. 9 is a flowchart illustrating a process at the time of a voltage supply start according to the embodiment.

Next, the process at the time of the voltage supply start executed by the device control apparatus 1 will be described with reference to FIG. 9. FIG. 9 is a flowchart illustrating the process at the time of the voltage supply start according to the embodiment. As illustrated in FIG. 9, in the device control apparatus 1, the monitoring unit 15 determines whether the voltage supply from the battery 2 starts during the sleep mode (step S201).

Here, for example, when the output voltage of the battery 2 is lower than 5 V, the monitoring unit 15 determines that the voltage supply from the battery 2 does not start (step S201, No), outputs the state signal Sig2 showing that the voltage supply from the battery 2 does not start to the control unit 12, and makes the process proceed to step S201. If this state signal Sig2 is input, the control unit 12 continuously maintains the sleep mode.

Meanwhile, if the output voltage of the battery 2 increases to 5 V, the monitoring unit 15 determines that the voltage supply starts (step S201, Yes) and outputs the switching signal Sig1 to turn on the third switch SW3. However, at this point of time, the monitoring unit 15 dose not output the state signal Sig2 showing that the voltage supply by the battery 2 starts to the control unit 12 and makes the process proceed to step S202. A determination reference used when the monitoring unit 15 determines whether the voltage supply starts is not limited to 5 V and may be any voltage.

In step S202, the monitoring unit 15 determines whether the charging rate of the accumulation unit 14 becomes the predetermined value (for example, 100% (full charging), 95%, or 90%) or more. When it is determined that the charging rate does not become the predetermined value or more (step S202, No), the control unit 12 continuously executes charging of the accumulation unit 14 (step S203) and makes the process proceed to step S202.

Meanwhile, when it is determined that the charging rate of the accumulation unit 14 becomes the predetermined value or more (step S202, Yes), the monitoring unit 15 outputs the state signal Sig2 showing that the charging rate becomes the predetermined value or more to the control unit 12 and outputs the switching signal Sig1 to turn off the third switch SW3. Thereby, the voltage supply from the battery 2 to the control unit 12 starts (step S204).

Next, the control unit 12 changes from the sleep mode to the idle mode (step S205), outputs the switching signal Sig3 to turn on the first switch SW1, and starts the voltage supply to the S/R target devices 31 (step S206).

In addition, the control unit 12 executes the resume process of the S/R target devices 31 (step S207). Here, the control unit 12 returns the state of each application 51 to the state before changing to the sleep mode, on the basis of the S/R information 53 stored in the storage unit 43. Furthermore, the control unit 12 specifies the application 51 using the S/R non-target devices 32 started before changing to the sleep mode on the basis of the S/R information 53 and ends the application.

Then, the control unit 12 outputs the switching signal Sig4 to turn on the second switch SW2, starts the voltage supply to the S/R non-target devices 32 (step S208), and initializes the states of the S/R non-target devices 32 (step S209). Next, the control unit 12 executes a process for releasing the protection setting of the S/R non-target devices 32 (step S210) and changes from the idle mode to the normal mode (step S211). Then, the control unit 12 executes the normal operation process (step S212) and ends the process.

As described above, the device control apparatus according to the embodiment includes the monitoring unit, the first processing unit, and the second processing unit. The monitoring unit monitors the state of the voltage supply from the battery. When the start of the voltage supply is detected by the monitoring unit, the first processing unit starts the voltage supply from the battery to some devices among the plurality of devices using the battery as the power supply, operates in the first operation mode, and executes the resume process of some devices.

In addition, when the resume process is completed, the second processing unit starts the voltage supply from the battery to the devices other than some devices, initializes the states of the devices other than some devices, and operates in the second operation mode in which the consumption power is larger than the consumption power of the first operation mode. Therefore, according to the device control apparatus, when the voltage supply from the battery supplying the voltage to the plurality of devices is resumed, the resume of the operations of the devices can be normally performed.

The device control apparatus according to the embodiment further includes the accumulation unit that accumulates the voltage charged by the voltage supplied from the battery and supplies the voltage to the first processing unit. The first processing unit starts the resume process, when the accumulation rate of the accumulation unit becomes the predetermined value or more. Thereby, even though the output voltage of the battery decreases during the resume process, the device control apparatus can normally complete the resume process by the voltage accumulated in the accumulation unit.

When the stop of the voltage supply is detected by the monitoring unit, the second processing unit according to the embodiment stops the voltage supply from the battery to the devices other than some devices. In addition, when the voltage supply from the battery to the devices other than some devices is stopped, the first processing unit operates in the first operation mode and executes the suspend process of some devices. Then, the first processing unit stops the voltage supply from the battery to some devices.

Thereby, because the device control apparatus can normally complete the suspend process for some devices, the device control apparatus can normally execute the resume process to be executed thereafter and normally restart the devices. As described above, for the devices other than some devices, because the operation starts from the initialized state when the devices restart, the operation can be normally started.

In addition, the second processing unit according to the embodiment prohibits the operation request from being input to the devices, before the voltage supply from the battery to the devices other than some devices is stopped. Thereby, the devices can be prevented from being damaged due to the input of the operation request in a state in which the voltage supply is stopped.

In addition, the first processing unit according to the embodiment ends the application software during the period in which the resume process is executed, when the application software using the devices starts before the voltage supply from the battery to the devices other than some devices is stopped. Thereby, when the devices other than some devices restart, the devices can be normally started from the initial state.

In addition, the device control apparatus according to the embodiment further includes the boosting unit that boosts the voltage supplied from the battery to the accumulation unit. Thereby, as compared with the case in which the boosting unit is not provided, it is possible to increase an operation enabled time of the devices by the voltage supplied from the accumulation unit, instead of the battery. Therefore, the suspend process and the resume process can be normally completed in the increased operation enabled time of the devices.

According to one aspect of the present embodiment, when voltage supply from a battery to supply a voltage to a plurality of devices is resumed, operations of the devices can be normally resumed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A device control apparatus comprising:
a monitoring unit that monitors a state of voltage supply from a battery;
a first processing unit that, when a start of the voltage supply is detected by the monitoring unit, starts the voltage supply from the battery to a first group of devices among a plurality of devices using the battery as a power supply, operates in a first operation mode, and executes a resume process of the first group of devices; and
a second processing unit that, when the resume process is completed, starts the voltage supply from the battery to a second group of devices other than the first group of devices among the plurality of devices, initializes states of the second group of devices, and operates in a second operation mode in which consumption power is larger than consumption power of the first operation mode.

2. The device control apparatus according to claim 1, further comprising an accumulation unit that accumulates a voltage charged by the voltage supplied from the battery and supplies the voltage to the first processing unit, wherein
the first processing unit starts the resume process, when an accumulation rate of the accumulation unit becomes a predetermined value or more.

3. The device control apparatus according to claim 1, wherein
when a stop of the voltage supply is detected by the monitoring unit, the second processing unit stops the voltage supply from the battery to the second group of devices, and
when the voltage supply from the battery to the second group of devices is stopped, the first processing unit operates in the first operation mode, executes a suspend process of the first group of devices, and stops the voltage supply from the battery to the first group of devices.

4. The device control apparatus according to claim 2, wherein
when a stop of the voltage supply is detected by the monitoring unit, the second processing unit stops the voltage supply from the battery to the second group of devices, and
when the voltage supply from the battery to the second group of devices is stopped, the first processing unit operates in the first operation mode, executes a suspend process of the first group of devices, and stops the voltage supply from the battery to the first group of devices.

5. The device control apparatus according to claim 1, wherein
the second processing unit prohibits an operation request from being input to the second group of devices, before the voltage supply from the battery to the second group of devices is stopped.

6. The device control apparatus according to claim 2, wherein
the second processing unit prohibits an operation request from being input to the second group of devices, before the voltage supply from the battery to the second group of devices is stopped.

7. The device control apparatus according to claim 3, wherein
the second processing unit prohibits an operation request from being input to the second group of devices, before the voltage supply from the battery to the second group of devices is stopped.

8. The device control apparatus according to claim 4, wherein
the second processing unit prohibits an operation request from being input to the second group of devices, before the voltage supply from the battery to the second group of devices is stopped.

9. The device control apparatus according to claim 1, wherein
when application software using the second group of devices starts before the voltage supply from the battery to the second group of devices is stopped, the first processing unit ends the application software during a period in which the resume process is executed.

10. The device control apparatus according to claim 2, wherein
when application software using the second group of devices starts before the voltage supply from the battery to the second group of devices is stopped, the first processing unit ends the application software during a period in which the resume process is executed.

11. The device control apparatus according to claim 3, wherein
when application software using the second group of devices starts before the voltage supply from the battery to the second group of devices is stopped, the first processing unit ends the application software during a period in which the resume process is executed.

12. The device control apparatus according to claim 4, wherein
when application software using the second group of devices starts before the voltage supply from the battery to the second group of devices is stopped, the first processing unit ends the application software during a period in which the resume process is executed.

13. The device control apparatus according to claim 5, wherein
when application software using the second group of devices starts before the voltage supply from the battery to the second group of devices is stopped, the fit processing unit ends the application software during a period in which the resume process is executed.

14. The device control apparatus according to claim 6, wherein
when application software using the second group of devices before the voltage supply from the battery to the second group of devices is stopped, the first processing unit ends the application software during a period in which the resume process is executed.

15. The device control apparatus according to claim 7, wherein
when application software using the second group of devices starts before the voltage supply from the battery to the second group of devices is stopped, the fit processing unit ends the application software during a period in which the resume process is executed.

16. The device control apparatus according to claim 8, wherein
when application software using the second group of devices starts before the voltage supply from the battery to the second group of devices is stopped, the first processing unit ends the application software during a period in which the resume process is executed.

17. The device control apparatus according to claim 2, further comprising a boosting unit that boosts the voltage supplied from the battery to the accumulation unit.

18. The device control apparatus according to claim 4, further comprising a boosting unit that boosts the voltage supplied from the battery to the accumulation unit.

19. The device control apparatus according to claim 6, further comprising a boosting unit that boosts the voltage supplied from the battery to the accumulation unit.

20. The device control apparatus according to claim 1, wherein the monitoring unit detects that the voltage supply from the battery starts.

21. A device control method comprising:
causing a monitoring unit to monitor a state of voltage supply from a battery;
causing a first processing unit to, when the voltage supply from the battery starts, start the voltage supply to a first group of devices among a plurality of devices using the battery as a power supply and execute a resume process of the first group of devices in a first operation mode; and
causing a second processing unit to, when the resume process is completed, start the voltage supply to a second group of devices other than the first group of device among the plurality of devices, initialize states of the second group of devices, and change an operation mode to a second operation mode in which consumption power is larger than consumption power of the first operation mode.

* * * * *